United States Patent
Satake et al.

(10) Patent No.: US 9,777,954 B2
(45) Date of Patent: Oct. 3, 2017

(54) EXPANSION VALVE WITH VIBRATION PROOF SPRING

(71) Applicant: TGK CO., LTD., Tokyo (JP)

(72) Inventors: Ryosuke Satake, Tokyo (JP); Takeshi Kaneko, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 15/168,891

(22) Filed: May 31, 2016

(65) Prior Publication Data

US 2016/0356533 A1    Dec. 8, 2016

(30) Foreign Application Priority Data

Jun. 4, 2015 (JP) ................................. 2015-113551

(51) Int. Cl.
*F25B 41/06* (2006.01)
*F16K 1/14* (2006.01)
(Continued)

(52) U.S. Cl.
CPC .............. *F25B 41/062* (2013.01); *F16K 1/14* (2013.01); *F16K 1/32* (2013.01); *F16K 27/0245* (2013.01);
(Continued)

(58) Field of Classification Search
CPC ............ F25B 2341/06; F25B 2341/068; F25B 2341/0683
See application file for complete search history.

(56) References Cited

U.S. PATENT DOCUMENTS

| 5,597,117 A * | 1/1997 | Watanabe | F25B 41/062 236/92 B |
| 2004/0007015 A1* | 1/2004 | Sendo | F25B 41/062 62/527 |

(Continued)

FOREIGN PATENT DOCUMENTS

| CN | 101101065 A | 1/2008 |
| EP | 1 598 581 A1 | 11/2005 |

(Continued)

OTHER PUBLICATIONS

Extended European search report (EESR) issued on Oct. 5, 2016 in corresponding European Patent Application No. 16171954.7 (6 pgs.).

*Primary Examiner* — Jonathan Bradford
(74) *Attorney, Agent, or Firm* — Muncy, Geissler, Olds & Lowe, P.C.

(57) ABSTRACT

An expansion valve includes: a body having an insertion hole in a partition separating a first passage from a second passage; a power element configured to generate a drive force for opening or closing a valve section; a shaft extending through the insertion hole and configured to transmit the drive force to a valve element; a vibration-proof spring coaxially supporting the shaft and biasing the shaft radially inward to apply a sliding resistance thereto; and a flexible O-ring supported by one of an inner surface of the support part defining the insertion hole and an outer surface of the shaft and being in close contact with the other thereof. The O-ring, sliding portions of the shaft and the support part, and the vibration-proof spring are arranged in this order from a first passage side toward a second passage side in an axial direction of the shaft.

11 Claims, 4 Drawing Sheets

(51) Int. Cl.
    *F16K 1/32*    (2006.01)
    *F16K 27/02*   (2006.01)
    *F16K 31/00*   (2006.01)
(52) U.S. Cl.
    CPC .... *F16K 31/002* (2013.01); *F25B 2341/0683* (2013.01); *F25B 2500/13* (2013.01)

(56) References Cited

U.S. PATENT DOCUMENTS

2007/0022769 A1    2/2007  Honda et al.
2013/0283836 A1*  10/2013  Satake ................. F25B 41/062
                                                            62/225

FOREIGN PATENT DOCUMENTS

| EP | 2 642 223 A1 | 9/2013 |
| EP | 2 667 118 A2 | 11/2013 |
| JP | 5-157406 A | 6/1993 |
| JP | 2013-242129 A | 12/2013 |
| KR | 20110115417 A | 10/2011 |

* cited by examiner

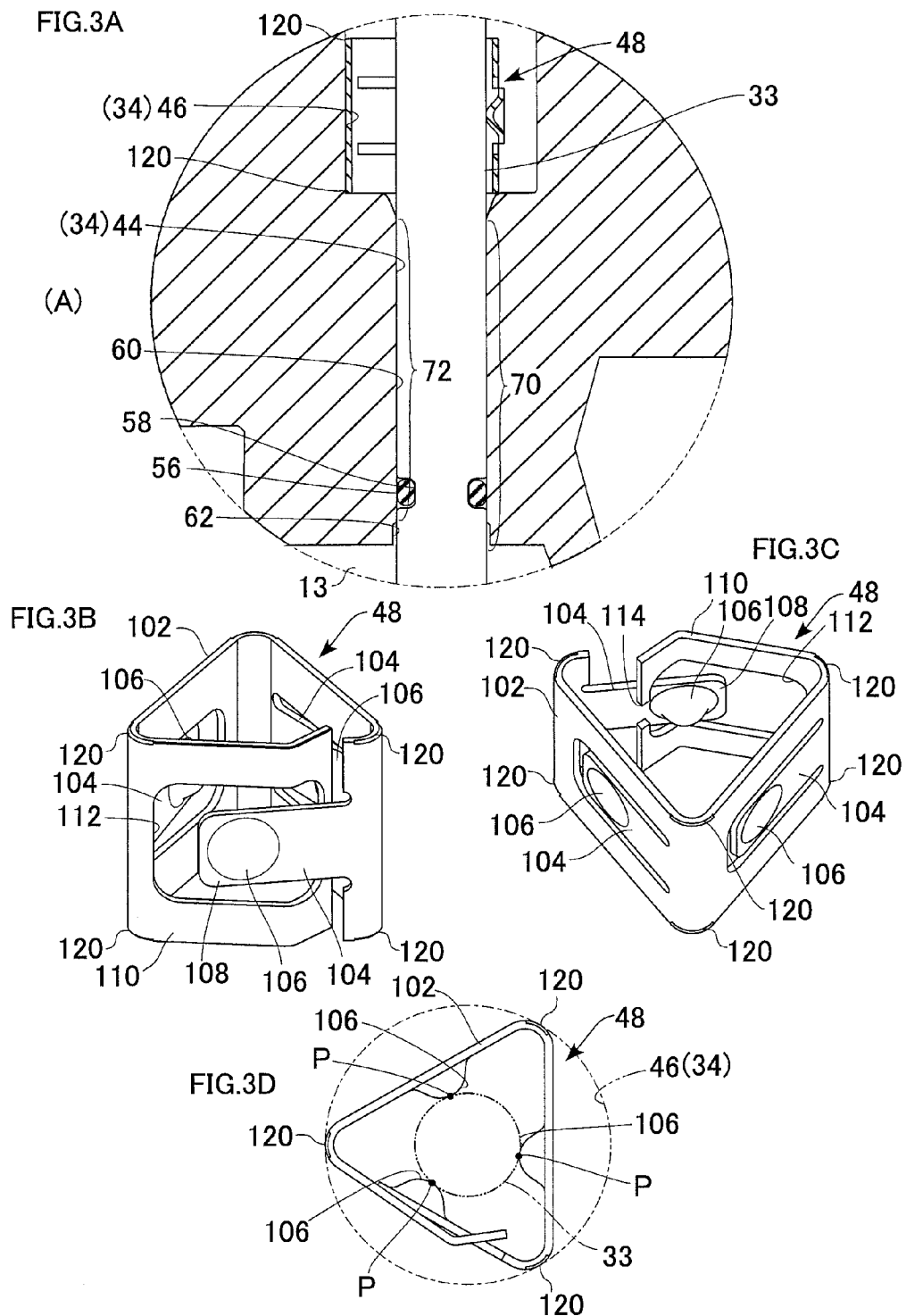

EXPANSION VALVE WITH VIBRATION PROOF SPRING

CLAIM OF PRIORITY

This application claims priority to Japanese Patent Application No. 2015-113551, filed on Jun. 4, 2015, and is incorporated herein by reference.

BACKGROUND OF THE INVENTION

1. Field of the Invention

The present invention relates to an expansion valve, and more particularly to a thermostatic expansion valve suitable for use in a refrigeration cycle.

2. Description of the Related Art

A refrigeration cycle in an automotive air conditioner generally includes a compressor for compressing a circulating refrigerant, a condenser for condensing the compressed refrigerant, an expansion valve for throttling and expanding the condensed liquid refrigerant and delivering the resulting spray of refrigerant, and an evaporator for cooling the air in a vehicle interior using evaporative latent heat of the refrigerant. The expansion valve is, for example, a thermostatic expansion valve that senses the temperature and the pressure of the refrigerant on the outlet side of the evaporator and adjusts the valve opening degree so that the refrigerant delivered from the evaporator has a predetermined degree of superheat, to control the flow rate of the refrigerant to be delivered to the evaporator.

Such an expansion valve has a body in which a first passage through which the refrigerant flowing from the condenser toward the evaporator passes and a second passage through which the refrigerant having returned from the evaporator passes are formed. The first passage includes a valve hole, and a valve element disposed facing the valve hole. The valve element moves toward and away from the valve hole to regulate the flow rate of the refrigerant flowing toward the evaporator. A power element that senses the temperature and the pressure of the refrigerant flowing through the second passage and operates in response to the sensed temperature and pressure is provided at one end of the body. The drive force of the power element is transmitted to the valve element via a shaft. The shaft extends through an insertion hole formed in a partition that separates the first passage from the second passage, and is supported slidably against the body. One end of the shaft is connected to the power element, and the other end thereof extends through the valve hole and is connected to the valve element (refer to Japanese Unexamined Patent Application Publication No. 2013-242129, for example).

RELATED ART LIST

Japanese Unexamined Patent Application Publication No. 2013-242129

Typically, in such an expansion valve, the body is made of a soft material such as an aluminum alloy and the shaft is made of a hard material such as stainless steel. The body may thus be worn by sliding of the shaft and generate wear debris. Since a clearance is present between a support part, which is part of the body and forms an insertion hole, and the shaft, the axes of the support part and the shaft may be misaligned in parallel or may intersect each other while the valve element is driven. This may cause uneven contact of the shaft with the support part or localized contact of the shaft with respective end positions of the support part, which may accelerate the wear. Thus increased wear debris may adhere to the shaft and increase sliding resistance (friction), which may lower the actuation responsiveness of a valve section.

SUMMARY OF THE INVENTION

The present invention has been made in view of such circumstances, and one purpose thereof is to prevent or reduce wear caused by sliding of a shaft and a body of a thermostatic expansion valve along each other and to prevent or reduce adhesion of wear debris to the shaft.

One embodiment of the present invention relates to an expansion valve for use in a refrigeration cycle, for throttling and expanding a refrigerant flowing from an upstream side and supplying the expanded refrigerant to an evaporator. The expansion valve includes: a body having a first passage through which the refrigerant flowing from the upstream side to the evaporator passes, a second passage through which the refrigerant returning from the evaporator passes, a valve hole formed in the first passage, and an insertion hole formed coaxially with the valve hole in a partition separating the first passage from the second passage; a valve element configured to move toward and away from the valve hole to close and open a valve section; a power element provided on the body and configured to sense a temperature and a pressure of the refrigerant flowing through the second passage and generate a drive force for opening or closing the valve section; a shaft extending through the insertion hole, having a first end connected to the power element and a second end connected to the valve element, and being configured to transmit the drive force of the power element to the valve element; a vibration-proof spring fixed to the body coaxially with the insertion hole, the vibration-proof spring supporting the shaft so that the shaft coaxially extends through the vibration-proof spring, the vibration-proof spring biasing the shaft radially inwardly to apply a sliding resistance to the shaft; and a seal ring having flexibility and being supported by one of an inner surface of a support part of the body defining the insertion hole and an outer surface of the shaft, the seal ring being in close contact with the other of the inner surface of the support part and the outer surface of the shaft.

The expansion valve includes an arrangement of the seal ring, sliding portions of the shaft and the support part, and the vibration-proof spring in this order from a first passage side toward a second passage side in an axial direction of the shaft.

In this embodiment, the vibration-proof spring and the seal ring are positioned with the sliding portions of the shaft and the support part therebetween. As a result, the shaft is supported at two points by two shock absorbing members, which are the vibration-proof spring and the seal ring. This allows high coaxiality of the shaft with the support part to be maintained. Consequently, wear of the support part is prevented or reduced, and adhesion of wear debris to the shaft is thus prevented or reduced. Furthermore, since the seal ring is disposed on a relatively high pressure side (on the first passage side) with respect to the sliding portions, entry of foreign materials between the sliding portions is effectively prevented or reduced.

BRIEF DESCRIPTION OF THE DRAWINGS

FIGS. 3A to 3D illustrate the support structure for supporting the shaft and the surrounding structures thereof.

DETAILED DESCRIPTION OF THE INVENTION

Figure 1:
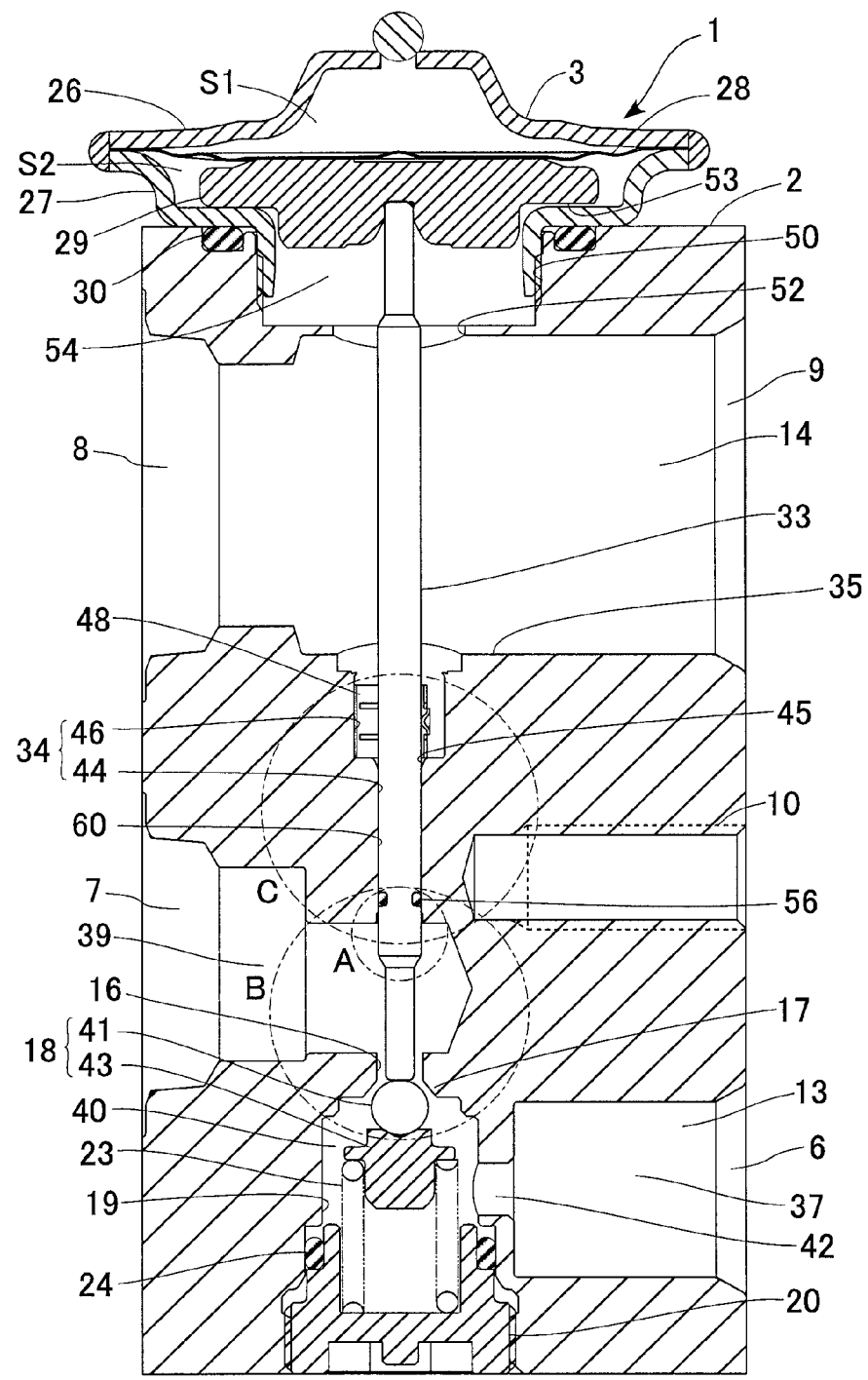
FIG. 1 is a cross-sectional view of an expansion valve according to an embodiment.

The invention will now be described by reference to the preferred embodiments. This does not intend to limit the scope of the present invention, but to exemplify the invention.

An Embodiment of the present invention will now be described in detail with reference to the drawings. In the following description, for convenience of description, the positional relationship in each structure may be expressed with reference to how each structure is depicted in the drawings. Note that components that are substantially the same in the following embodiment and the modifications thereof will be designated by the same reference numerals and that redundant description thereof may be omitted as appropriate.

The embodiment embodies an expansion valve of the present invention in a form of a thermostatic expansion valve applicable to a refrigeration cycle in an automotive air conditioner. The refrigeration cycle includes a compressor for compressing a circulating refrigerant, a condenser (external heat exchanger) for condensing the compressed refrigerant, a receiver for separating the condensed refrigerant into gas and liquid, an expansion valve for throttling and expanding the separated liquid refrigerant and delivering the resulting spray of refrigerant, and an evaporator (internal heat exchanger) for evaporating the misty refrigerant to cool the air in a vehicle interior by evaporative latent heat. For convenience of description, detailed description of components other than the expansion valve will be omitted herein.

FIG. 1 is a cross-sectional view of the expansion valve according to the embodiment.

The expansion valve 1 has a body 2 formed by extrusion molding of a material made of an aluminum alloy and performing predetermined cutting on the member obtained by the extrusion molding. The body 2 has a prism shape, and has a valve section in the inside thereof for throttling and expanding the refrigerant. A power element 3, which functions as a "drive section", is disposed at an end in the longitudinal direction of the body 2.

The body 2 has, on sides thereof, an inlet port 6 through which a high-temperature and high-pressure liquid refrigerant is introduced from the receiver side (condenser side), an outlet port 7 through which the low-temperature and low-pressure refrigerant resulting from the throttling expansion through the expansion valve 1 is delivered toward the evaporator, an inlet port 8 through which the refrigerant evaporated by the evaporator is introduced, and an outlet port 9 through which the refrigerant having passed through the expansion valve 1 is delivered to the compressor side. A screw hole 10, into which a not-shown stud bolt for mounting a pipe can be screwed, is formed between the inlet port 6 and the outlet port 9. Each of the ports is connected with a pipe joint.

In the expansion valve 1, the inlet port 6, the outlet port 7, and a refrigerant passage connecting these ports constitute a first passage 13. A valve section is formed in an intermediate portion of the first passage 13. The refrigerant introduced through the inlet port 6 is throttled and expanded into a spray through the valve section, and delivered toward the evaporator through the outlet port 7. In addition, the inlet port 8, the outlet port 9, and a refrigerant passage connecting these ports constitute a second passage 14. The second passage 14 extends straight and an intermediate portion thereof communicates with the inside of the power element 3. Part of the refrigerant introduced through the inlet port 8 is supplied to the power element 3 by which the temperature of the refrigerant is sensed. The refrigerant having passed through the second passage 14 is delivered toward the compressor through the outlet port 9.

A valve hole 16 is formed at the intermediate portion of the first passage 13, and a valve seat 17 is formed by an open end edge of the valve hole 16 on the side of the inlet port 6. A valve element 18 is disposed facing the valve seat 17 from the side of the inlet port 6. The valve element 18 has a spherical ball valve element 41 for opening and closing the valve section by leaving and touching the valve seat 17, and a valve element support 43 for supporting the ball valve element 41 from below, which are joined together.

A communication hole 19 connecting the inside and the outside of the body 2 is formed in a lower part of the body 2. The upper half of the communication hole 19 forms a valve chamber 40, in which the valve element 18 is accommodated. The valve chamber 40 communicates with the valve hole 16, and is formed coaxially with the valve hole 16. The valve chamber 40 also communicates with the inlet port 6 at a lateral side thereof via an upstream-side passage 37. The upstream-side passage 37 includes a small hole 42 that is open toward the valve chamber 40. The small hole 42 is a portion of the first passage 13 where the cross-section thereof is locally made small.

The valve hole 16 communicates with the outlet port 7 via a downstream-side passage 39. Thus, the upstream-side passage 37, the valve chamber 40, the valve hole 16, and the downstream-side passage 39 constitute the first passage 13. The upstream-side passage 37 and the downstream-side passage 39 are parallel to each other and each extend in a direction perpendicular to the axis of the valve hole 16. In a modification, the inlet port 6 or the outlet port 7 may be positioned so that projections of the upstream-side passage 37 and the downstream-side passage 39 are perpendicular to each other (so that the upstream-side passage 37 and the downstream-side passage 39 are skew with respect to each other).

An adjusting screw 20 is screwed into a lower half of the communication hole 19 in such a manner as to seal the communication hole 19 from outside. A spring 23 for biasing the valve element 18 in a valve closing direction is disposed between the valve element 18 (more specifically, the valve element support 43) and the adjusting screw 20. The load of the spring 23 can be adjusted by adjustment of the insertion amount of the adjusting screw 20 into the body 2. An O-ring 24 for preventing leakage of the refrigerant is disposed between the adjusting screw 20 and the body 2.

A recess 50 is formed at an upper end of the body 2, and an opening 52 connecting the inside and the outside of the body 2 is formed at a bottom of the recess 50. The power element 3 has a lower part screwed into the recess 50 and is mounted on the body 2 in such a manner as to seal the opening 52. A space between the recess 50 and the power element 3 constitutes a temperature sensitive chamber 54.

The power element 3 has a diaphragm 28 provided between an upper housing 26 and a lower housing 27 thereof, and a disc 29 disposed on the lower housing 27 side of the diaphragm 28. The upper housing 26 is formed by press-forming a stainless steel material into a lidded shape.

The lower housing 27 is formed by press-forming a stainless steel material into a stepped cylindrical shape. The disc 29 is made of aluminum or an aluminum alloy, for example, and has a higher thermal conductivity than the upper and lower housings. The diaphragm 28 is made of a metal thin film in the present embodiment; alternatively, the diaphragm 28 may be made of a thin film of a plastic material such as a polyimide film.

The power element 3 is formed in a shape of a container by making the upper housing 26 and the lower housing 27 in contact with each other at the openings thereof, mounting the diaphragm 28 so that an outer edge of the diaphragm 28 is placed between outer edges of the upper housing 26 and the lower housing 27, and welding along a circumferential joint of the upper and lower housing. The inside of the power element 3 is partitioned into a closed space S1 and an open space S2 by the diaphragm 28. A gas for sensing temperature is sealed in the closed space S1. The open space S2 communicates with the second passage 14 via the opening 52. An O-ring 30 for preventing leakage of the refrigerant is disposed between the power element 3 and the body 2. The pressure and the temperature of the refrigerant passing through the second passage 14 are transmitted to a lower surface of the diaphragm 28 through the opening 52 and a groove 53 formed on the disc 29. The temperature of the refrigerant is transmitted to the diaphragm 28 mainly by the disc 29 having a high thermal conductivity.

A stepped hole 34 is formed through a partition 35 that separates the first passage 13 from the second passage 14 at a middle part of the body 2. The stepped hole 34 is defined by a small-diameter part 44 and a large-diameter part 46, which are coaxial with each other. A lower end of the small-diameter part 44 is open toward the first passage 13, while an upper end of the large-diameter part 46 is open toward the second passage 14. The small-diameter part 44 constitutes an insertion hole through which an elongated shaft 33 is slidably inserted in the axial direction, and also functions as a support part 60 that slidably supports the shaft 33. The large-diameter part 46 constitutes a mounting hole in which a vibration-proof spring 48, which will be described below, is contained in a coaxial manner.

The shaft 33 is a rod made of a hard material such as stainless steel, and disposed between the disc 29 and the valve element 18. This enables the drive force generated by displacement of the diaphragm 28 to be transmitted to the valve element 18 via the disc 29 and the shaft 33 to open or close the valve section. One end side of the shaft 33 extends across the second passage 14 and is connected to the disc 29. The other end side of the shaft 33 extends into the first passage 13 and is connected to the valve element 18.

The large-diameter part 46 contains the vibration-proof spring 48 for applying biasing force in a direction perpendicular to the direction of axis of the shaft 33, that is, a lateral load (sliding load) onto the shaft 33. The shaft 33 is subjected to the lateral load of the vibration-proof spring 48, which suppresses vibration of the shaft 33 and the valve element 18 due to refrigerant pressure fluctuation.

The vibration-proof spring 48 is fixed coaxially with the small-diameter part 44, and supports the shaft 33 with the shaft 33 coaxially extending through the vibration-proof spring 48. The vibration-proof spring 48 biases the shaft 33 radially inward to apply sliding resistance (friction) thereto.

In the present embodiment, an O-ring 56 (which functions as a "seal ring") is disposed between the small-diameter part 44 and the shaft 33 to prevent leakage of the refrigerant from the first passage 13 to the second passage 14. The O-ring 56 has flexibility, is supported by an outer surface of the shaft 33, and is in close contact with the inner surface of the support part 60. As illustrated in FIG. 1, the O-ring 56, sliding portions of the shaft 33 and the support part 60 relative to (along) each other, and the vibration-proof spring 48 are arranged in this order along the axial direction of the shaft 33 from the first passage 13 side toward the second passage 14 side. The O-ring 56, the vibration-proof spring 48, and the surroundings thereof will be described in detail below.

In the expansion valve 1 having the structure as described above, the power element 3 senses the pressure and the temperature of refrigerant having returned from the evaporator via the inlet port 8, and the diaphragm 28 displaces. This displacement of the diaphragm 28 results in the drive force, which is transmitted to the valve element 18 via the disc 29 and the shaft 33 so as to open and close the valve section. In the meantime, a liquid refrigerant supplied from a receiver is introduced through the inlet port 6, throttled and expanded while passing through the valve section to be turned into a low-temperature and low-pressure spray of refrigerant. The refrigerant is delivered through the outlet port 7 toward the evaporator.

Next, a support structure for supporting the shaft 33 will be described in detail.

Figure 2A:
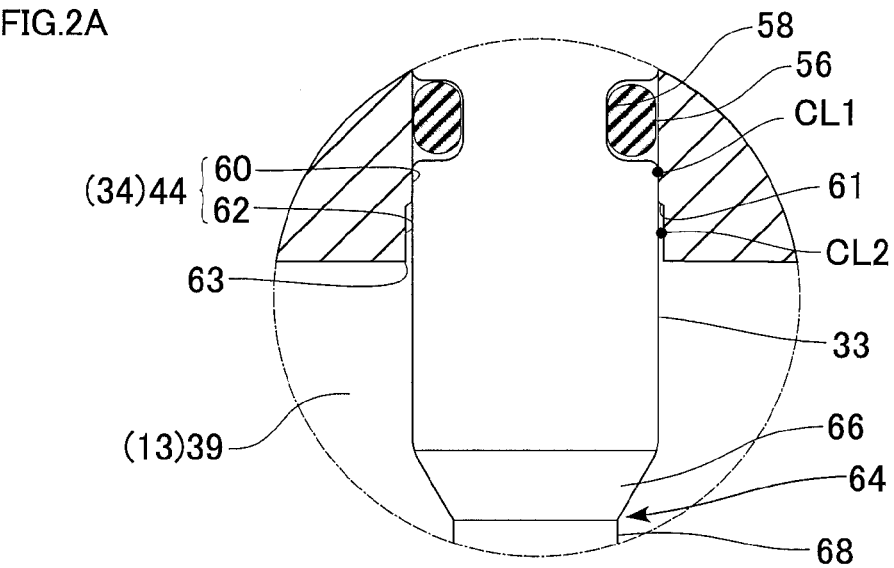
FIGS. 2A and 2B illustrate a support structure for supporting a shaft and surrounding structures thereof.
Figure 2B:
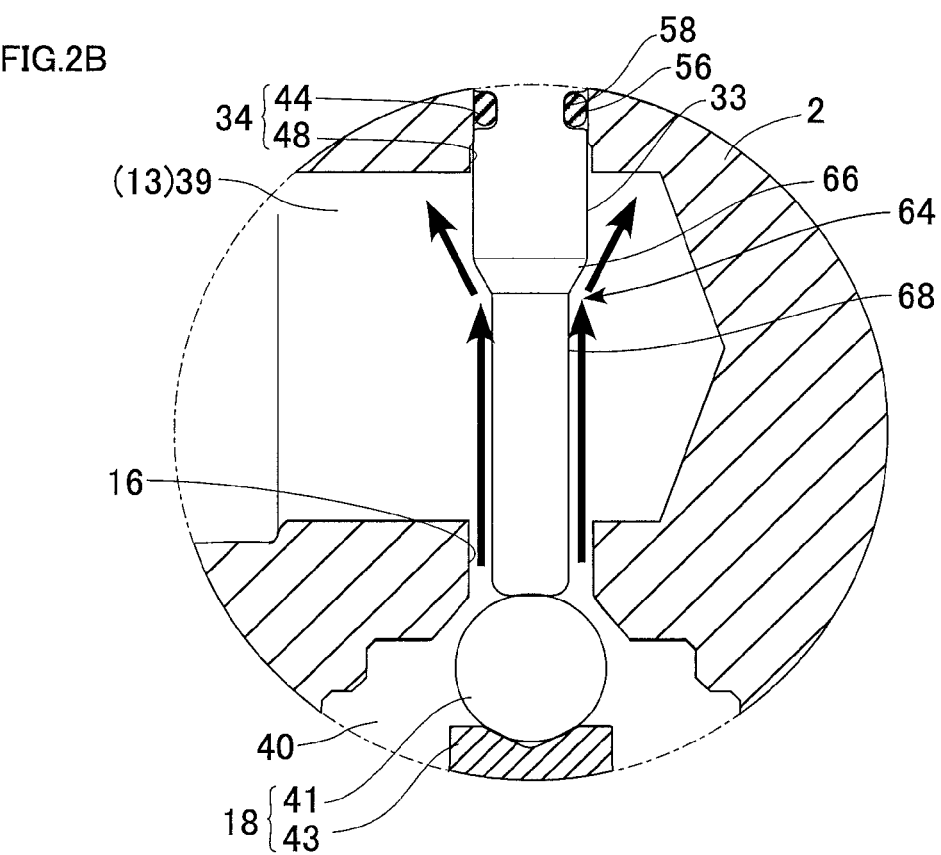

FIGS. 2A, 2B, and 3A to 3D illustrated the support structure for supporting the shaft 33 and surrounding structures thereof. FIG. 2A is an enlarged view of a part A in FIG. 1. FIG. 2B is an enlarged view of a part B in FIG. 1. FIG. 3A is an enlarged view of a part C in FIG. 1. FIG. 3B is a perspective view of the vibration-proof spring 48 as viewed from the front. FIG. 3C is a perspective view of the vibration-proof spring 48 as viewed from the back. FIG. 3D is a plan view illustrating the vibration-proof spring 48 inserted in the large-diameter part 46.

As illustrated in FIG. 2A, the small-diameter part 44 has the support part 60, which supports the shaft 33, and a diameter-enlarged part 62, which is open toward the downstream-side passage 39. The diameter of the diameter-enlarged part 62 is set to a diameter slightly larger than that of the support part 60 but not larger than that of the valve hole 16. A boundary between the support 60 and the diameter-enlarged part 62 is chamfered (C-chamfered) to form a tapered boundary surface 61. An open end 63 of the diameter-enlarged part 62 is not chamfered but has an edged shape. Although the taper angle of the chamfering is set to be 45 degrees with respect to an axis of the stepped hole 34 in the present embodiment, a taper angle of a different value may alternatively be employed. Furthermore, although the chamfering is C-chamfering in the present embodiment, the chamfering may alternatively be R-chamfering (round chamfering).

This structure makes a clearance CL1 between the support part 60 and the shaft 33 small, and makes a clearance CL2 between the diameter-enlarged part 62 and the shaft 33 larger than the clearance CL1. As a result, even if a burr is created on the open end 63 of the diameter-enlarged part 62 in the formation of the stepped hole 34, the burr is less likely to interfere with the shaft 33 and is less likely to be trapped or stuck between the sliding portions of the support part 60 and shaft 33.

In addition, as also illustrated in FIG. 2B, the shaft 33 has a stepped portion 64 having a gradually reduced diameter in the downstream-side passage 39. The stepped portion 64 has a tapered opposed surface 66 facing the valve hole 16. A small-diameter portion 68 on one end side of the stepped portion 64 extends through the valve hole 16 and is connected with the valve element 18. The ball valve element 41 is in contact with the end of the shaft 33.

With the structure as described above, a liquid refrigerant introduced from the upstream side when the valve is opened is turned into a spray of gas-liquid two-phase refrigerant through a spacing (orifice passage) between the valve hole 16 and the small-diameter portion 68 and is delivered to the downstream-side passage 39 as indicated by thick arrows in FIG. 2B. In this process, the refrigerant at least partly flows along the small-diameter portion 68 but is made to change its flowing direction by the opposed surface 66. Thus, the refrigerant is less likely to flow toward the insertion hole 34.

Although not illustrated, the stepped hole 34 is processed as follows. Prior to the formation of the stepped hole 34, the body 2 is subjected to cutting with a not-illustrated drill (drilling tool), so that the upstream-side passage 37, the downstream-side passage 39, the communication hole 19 (the valve chamber 40), and the second passage 14 are formed in the body 2 (see FIG. 1).

Subsequently, drilling with a drill (drilling tool) is applied from above the body 2 to form the large-diameter part 46. Subsequently, drilling with a drill (drilling tool) is applied from below the body 2 to form the entire stepped hole 34. A cutting blade of the drill has a stepped portion for forming the diameter-enlarged part 62. In this process, since the stepped portion also has a cutting function for forming the boundary surface 61 described above, no burr will remain at the lower end opening of the support part 60. A burr, however, may be created on the open end 63 of the diameter-enlarged part 62. Since, however, the clearance CL2 described above is formed (see FIG. 2A), the burr will not interfere with the shaft 33. In other words, since the open end and its vicinity of the stepped hole 34 are enlarged in diameter, a burr, if any, created in the formation of the stepped hole 34 is less likely to interference with the shaft 33 when the shaft 33 is inserted. A burr is therefore prevented from being caught or less likely to be caught in the spacing between the shaft 33 and the stepped hole 34 (support part 60).

Furthermore, since the shaft 33 has the stepped portion 64, the refrigerant having passed through the valve hole 16 changes its flowing direction along the tapered opposed surface 66. As a result, a jet flow from the valve hole 16 avoids the portion where a burr may occur. In other words, such a situation in which the jet flow pushes a burr or other foreign materials into the spacing between the shaft 33 and the stepped hole 34 (support part 60) can be avoided or reduced. Furthermore, a wall surface of the downstream-side passage 39 is cut to form the diameter-enlarged part 62, which is advantageous in that high accuracy of the tapered surface (boundary surface 61) can be achieved relatively easily.

In addition, as illustrated in FIG. 2A, a fitting part 58 constituted by an annular recess (annular groove) is formed around the outer surface (sliding surface) of the shaft 33, and the O-ring 56 is fitted into the fitting part 58. This structure allows the O-ring 56 to be supported by the outer surface of the shaft 33 and to be in close contact with the inner surface of the support part 60. As also illustrated in FIG. 3A, the O-ring 56 is positioned on the first passage 13 side with respect to the center in the axial direction of a sliding portion 70 of the shaft 33 along the support part 60.

Note that the "sliding portion 70" refers to one continuous area of the shaft 33 along the axial direction, which slides along the support part 60. In this sense, strictly speaking, the fitting part 58 does not slide along the support part 60 (the O-ring 56 fitted into the fitting part 58 slides along the support part 60), but is formed at a position within the sliding portion 70. A sliding portion 72 of the small-diameter part 44 corresponds to the support part 60. The "sliding portion 72" herein refers to one continuous area of the support part 60, along which the shaft 33 can slide. Although, strictly speaking, the "sliding portion 72" is "a portion along which the shaft 33 slides", the term "sliding portion" is used herein.

More specifically, the small-diameter part 44 has, at the lower end thereof, the diameter-enlarged part 62 having a diameter larger than that of the support part 60. The diameter-enlarged part 62 is open downward toward the first passage 13. The O-ring 56 is fitted around the outer surface of the shaft 33, in close contact with a position near the open end of the support part 60 (a position near the diameter-enlarged part 62). In this state, the axis of the O-ring 56 is substantially coincident with that of the stepped hole 34 (small-diameter part 44).

As illustrated in FIG. 3B, the vibration-proof spring 48 has a cylindrical body 102 and three spring parts 104. The body 102 is triangular in cross section and has three flat side walls. The three spring parts 104 are respectively formed integrally with the three side walls. One of the three spring parts 104 is constituted by a portion extending to one end of the body 102. The remaining two spring parts 104 are constituted by portions obtained by punching out the side walls of the body 102 in U-shape. The spring parts 104 have base ends supported by the body 102 in a cantilever fashion, and distal ends extending in the circumferential direction substantially along the side walls of the body 102. The distal ends of the spring parts 104 have hemispherical swelling portions 106 protruding toward the inside of the body 102. The swelling portions 106 function as "contact portions", which comes into contact with the outer surface of the shaft 33.

The vibration-proof spring 48 is formed by bending a belt-like plate material at a plurality of positions along the extending direction of the plate material. Thus, a separated portion of the side walls, where the respective ends of the plate material meet each other, is present. Specifically, one of the three spring parts 104 corresponds to one end part 108 of the body 102 and has a projecting shape. The other end part 110 of the body 102 has an opening 112 of a substantially rectangular shape. The end of the end part 110 is bent toward the inside of the body 102. The end part 108 is inserted through the bent portion of the end part 110, so that the respective end parts 108 and 110 of the body 102 overlap with each other in the width direction.

As illustrated in FIG. 3C, the end of the end part 110 is partially open to form an opening 114. Since, however, the width of the opening 114 is not larger than the width of the spring part 104 corresponding to the end part 108 of the body 102, the opening 114 will be substantially closed when the end parts 108 and 110 are engaged with each other under an unloaded condition. With this structure, other members are less likely to get caught in a spacing between the end parts 108 and 110 of the body 102. Specifically, in view of packaging of a plurality of vibration-proof springs 48 together instead of packaging a single vibration-proof spring 48, the structure described above prevents the vibration-proof springs 48 from getting caught by each other in such a circumstance to facilitate handling thereof.

The vibration-proof spring 48 has a non-equilateral triangular cross section with a corner, where the respective end parts of the body 102 are present, being positioned slightly outward under the unloaded condition before the vibration-proof spring 48 is inserted into the large-diameter part 46.

For inserting the vibration-proof spring 48 into the stepped hole 34, a load is applied so as to make the respective end parts closer to each other, and the vibration-proof spring 48 is inserted in a shape close to an equilateral triangle in cross section. Since the vibration-proof spring 48 is inserted into the stepped hole 34 in a state elastically deformed from the unloaded state, the vibration-proof spring 48 is fixed to the large-diameter part 46 by an elastic reaction force when the load is released (see FIG. 3D). In this process, the axis of the vibration-proof spring 48 is substantially coincident with that of the stepped hole 34 (small-diameter part 44). In addition, the center of an inscribed circle passing through apexes P of the three swelling portions 106 is substantially coincident with the axis of the stepped hole 34 (small-diameter part 44).

The vibration-proof spring 48 also has edged portions 120 slightly protruding radially outward at positions corresponding to the vertexes of a triangle-like shape at a top end and a bottom end of the body 102. The edged portions 120 are caught in an inner wall of the large-diameter part 46, which stops the vibration-proof spring 48 in the axial direction. Specifically, as illustrated in FIGS. 3A and 3D, the vibration-proof spring 48 comes into contact with the inner wall of the large-diameter part 46 at the edges along the axial direction, on which the vertexes of the triangular cross section are present. In this process, the edged portions 120 formed at the respective ends in the axial direction of the body 102 are caught in the inner wall of the large-diameter part 46, which prevents displacement of the vibration-proof spring 48 in the axial direction.

When the vibration-proof spring 48 is inserted into the large-diameter part 46, the three spring parts 104 generate lateral loads (radially inward loads) toward the shaft 33. Specifically, as illustrated in FIGS. 3A and 3D, when the shaft 33 is inserted with the vibration-proof spring 48 having been inserted in the large-diameter part 46, the three spring parts 104 bend outward to be positioned substantially on the same planes as the side walls, and the elastic reaction force applies an appropriate amount of sliding force to the shaft 33. Note that the spring parts 104 bend radially outward in this manner when the shaft 33 is inserted. The spring parts 104 may be plastically deformed to some extent at this point, so that the pressing forces of the spring parts 104 against the shaft 33 (the sliding forces between the swelling portions 106 and the shaft 33) can be stabilized. In other words, the spring parts 104 may be used in the elastic range or in the plastic range thereof.

When the vibration-proof spring 48 is inserted in the large-diameter part 46 as illustrated in FIGS. 3A and 3D, the three swelling portions 106 come in point contact with the shaft 33. This structure enables the point-contact state of the swelling portions 106 with the shaft 33 to be always maintained even when the shaft 33 is tilted to some extent, and thus enables smooth support with the vibration-proof spring. In addition, since the vibration-proof spring 48 is stably maintained at a fixed position by the edged portions 120 being caught in the inner wall of the large-diameter part 46, the sliding resistance (friction) acting on the shaft 33 can be maintained at a target level.

As described above, in the present embodiment, the vibration-proof spring 48 and the O-ring 56 are positioned with the sliding portions of the shaft 33 and the support part 60 therebetween. As a result, the shaft 33 is supported at two points by two shock absorbing members, which are the vibration-proof spring 48 and the O-ring 56. This suppresses tilting of the shaft 33 with respect to the axis of the support part 60, and allows high coaxiality of the shaft 33 with the support part 60 to be maintained at least at the sliding portions between the two points. Consequently, wear of the support part 60 is prevented or reduced, and adhesion of wear debris to the shaft 33 is thus prevented or reduced. Furthermore, as described above, even if a burr is created in the formation of the stepped hole 34, entry of the burr between the sliding portions is prevented or reduced. This prevents the sliding resistance of the shaft 33 from increasing in an undesirable manner and maintains good actuation responsiveness of the valve section.

In particular, in the present embodiment, the O-ring 56 is disposed near an open end of the small-diameter part 44 (insertion hole) on the first passage 13 side, so that a large interval is present between the vibration-proof spring 48 and the O-ring 56. This achieves a sufficient distance between two shock absorbing members supporting the shaft 33 (distance between supporting points) to stably support the shaft 33 along the axis of the small-diameter part 44. In other words, uneven contact of the shaft 33 with the support part 60 due to parallel misalignment of the axes of the shaft 33 and the small-diameter part 44 can be prevented or reduced over substantially the entire sliding portions between the supporting points. In addition, even if the axis of the shaft 33 intersects the axis of the support part 60, the O-ring 56 located near the open end of the support part 60 prevents or reduces uneven contact (localized contact) of the shaft 33 with the open end. Consequently, the wear of the support part 60 is effectively reduced.

Furthermore, the O-ring 56 is disposed on a relatively high pressure side (on the first passage side) while the vibration-proof spring 48 is disposed on a relatively low pressure side (on the second passage side). This prevents leakage of the refrigerant from the first passage 13 to the second passage 14 and effectively prevents or reduces entry of foreign materials between the sliding portions.

The description of the present invention given above is based upon an illustrative embodiment. The embodiment is intended to be illustrative only and it will be obvious to those skilled in the art that various modifications could be further developed within the technical idea underlying the present invention.

Figure 4A:
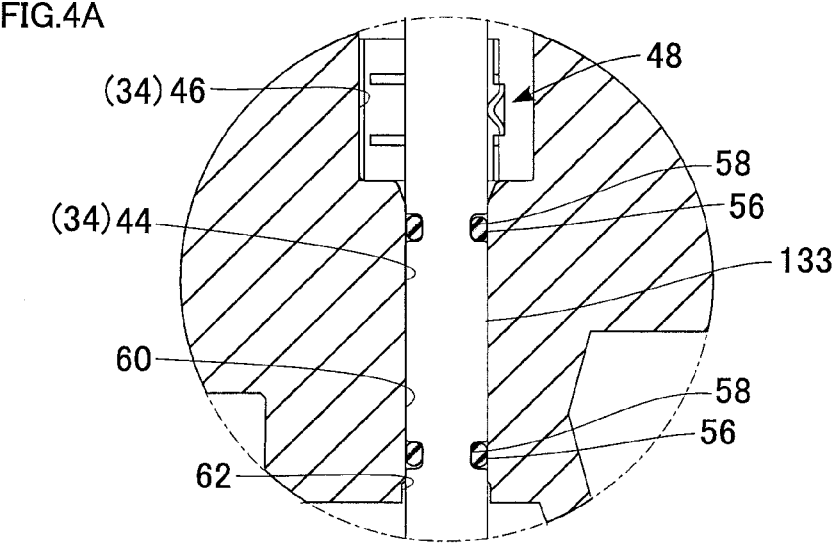
FIGS. 4A to 4C illustrate support structures for supporting a shaft according to modifications.
Figure 4B:
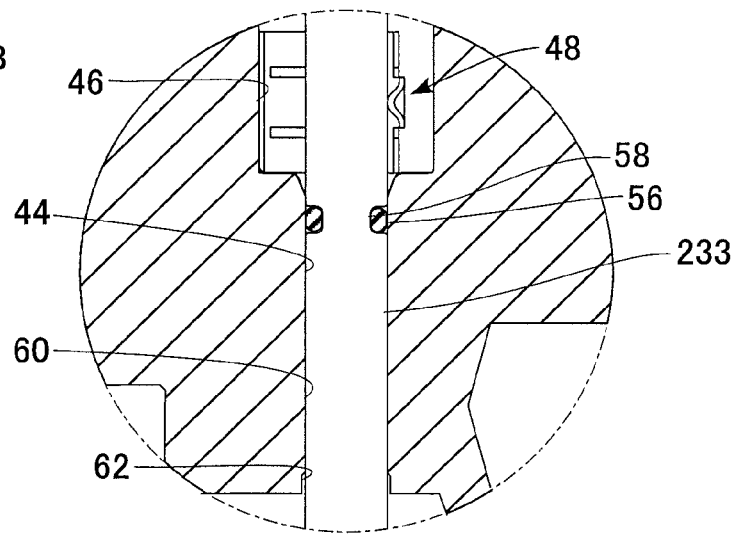
Figure 4C:
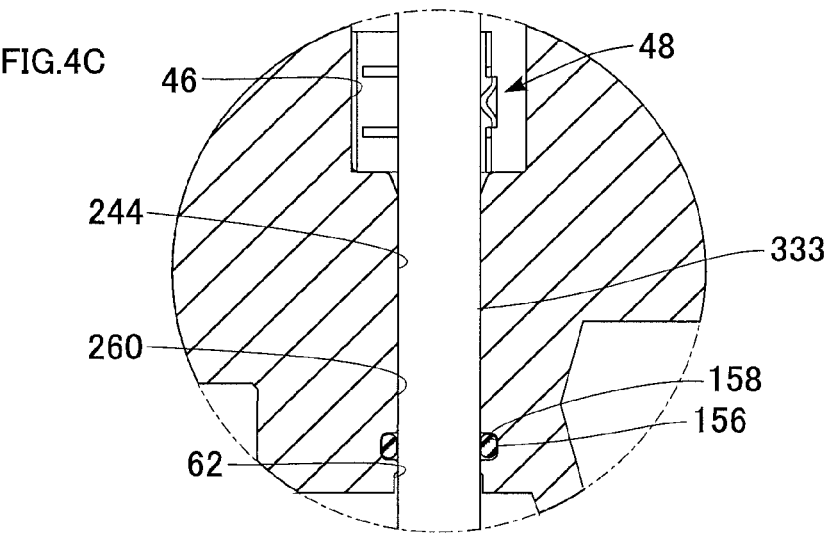

While an example of the support structure for supporting the shaft has been presented in the embodiment described above, a structure different from the above may be employed. FIGS. 4A to 4C illustrate support structures for supporting a shaft according to modifications. FIG. 4A illustrates a first modification, FIG. 4B illustrates a second modification, and FIG. 4C illustrates a third modification.

Specifically, as illustrated in FIG. 4A, a plurality of seal rings may be provided and a shaft 133 may be supported by three or more shock absorbing members. In the example illustrated in FIG. 4A, fitting parts 58 are formed at positions, which are opposed to an upper part (one end part) and to a lower part (the other end part) of the small-diameter part 44, on the outer surface of the shaft 133. O-rings 56 are fitted into the respective fitting parts 58.

Alternatively, as illustrated in FIG. 4B, a fitting part 58 may be formed at a position, which is opposed to an upper part of the small-diameter part 44, of a shaft 233, and an O-ring 56 may be fitted into the fitting part 58. Alternatively, as illustrated in FIG. 4C, a fitting part 158 constituted by an annular recess may be formed on a small-diameter part 244 (on the body), and an O-ring 156 may be fitted into the fitting part 158. In other words, the O-ring 156 may be supported by the inner surface of a support part 260 and in close contact with the outer surface of a shaft 333. Although the fitting part 158 is formed at a lower part of a small-diameter part 244 in the example illustrated in FIG. 4C, the fitting part 158 may be provided at an upper part of the small-diameter part 244 or fitting parts 158 may be provided at the upper part and the lower part of the small-diameter part 244.

Although the O-ring 56 of a circular shape in cross section is used in the embodiment described above, a seal ring having a polygonal cross section may be employed.

Although the vibration-proof spring 48 is structured to have a triangular shape in the embodiment described above, the vibration-proof spring 48 may alternatively have other polygonal cross sections or a cylindrical shape.

In the above-described embodiment, an example in which the edged portions 120 are formed on both the upper end and the lower end of vibration-proof spring 48 has been presented. In a modification, the edged portions 120 may be formed only on one of the upper end and the lower end of the vibration-proof spring 48. Furthermore, in the above-described embodiment, an example in which the edged portions 120 are formed on the outer surface of the vibration-proof spring 48 to maintain the fixing to the large-diameter part 46 has been presented. In a modification, a recess (a stepped portion) may be formed at a predetermined position on the inner wall of the mounting hole (large-diameter part 46) to catch an end of the vibration-proof spring 48.

In the above-described embodiment, as illustrated in FIG. 3D, an example in which the three spring parts 104 are positioned substantially on the same planes as the side walls when the shaft 33 is inserted with the vibration-proof spring 48 having been inserted in the large-diameter part 46 has been presented. In a modification, the three spring parts 104 may be bent to the outside of the sidewalls when the shaft 33 is inserted as described above. This is because the body 102 has a polygonal shape and the spring parts 104 can thus be bent into spaces between the side walls of the body 102 and the large-diameter part 46.

Alternatively, a structure in which the spring parts 104 are along the side walls under the unloaded condition of the vibration-proof spring 48 may be used. When the vibration-proof spring 48 is inserted into the large-diameter part 46 and the shaft 33 is then inserted into the vibration-proof spring 48, the spring parts 104 may bend to the outside of the body 102. Alternatively, when the shaft 33 is inserted as described above, the three spring parts 104 may be positioned inside of the side walls. Note, however, that the structure in which the spring parts 104 bend to be positioned on the same planes as the side walls of the body 102 or bend to the outside of the sidewalls of the body 102 when the shaft 33 is inserted as described above is advantageous in that the body 102 can be made compact.

Although the swelling portions 106 having a hemispherical shape have been presented in the above-described embodiment, the shape of the swelling portions 106 can be selected as appropriate from those protruding inward to be capable of applying an appropriate amount of sliding load to the shaft 33, such as an arch-like shape.

Although the expansion valve of the embodiment described above is suitably applicable to a refrigeration cycle using an alternative for chlorofluorocarbon (HFC-134a) or the like as the refrigerant, the expansion valve of the present invention can also be applied to a refrigeration cycle using a refrigerant such as carbon dioxide with high working pressure. In this case, an external heat exchanger such as a gas cooler is provided instead of the condenser in the refrigeration cycle. In this case, disc springs made of metal, for example, may be stacked in order to reinforce the diaphragm included in the power element 3.

In the embodiment described above, an example in which the expansion valve is a valve for throttling and expanding a refrigerant having flowed therein via an external heat exchanger and supplying the resulting refrigerant to an evaporator (internal evaporator) has been presented. In a modification, the expansion valve may be applied to a heat pump automotive air conditioner and disposed downstream of an internal condenser (internal heat exchanger). Specifically, the expansion valve may be a valve for throttling and expanding a refrigerant having flowed therein via an internal condenser and supplying the resulting refrigerant to an external heat exchanger (external evaporator).

The present invention is not limited to the above-described embodiments and modifications only, and those components may be further modified to arrive at various other embodiments without departing from the scope of the invention. Various other embodiments may be further formed by combining, as appropriate, a plurality of structural components disclosed in the above-described embodiments and modifications. Furthermore, one or some of all of the components exemplified in the above-described embodiments and modifications may be left unused or removed.

What is claimed is:

1. An expansion valve for use in a refrigeration cycle, for throttling and expanding a refrigerant flowing from an upstream side and supplying the expanded refrigerant to an evaporator, the expansion valve comprising:
    a body having a first passage through which the refrigerant flowing from the upstream side to the evaporator passes, a second passage through which the refrigerant returning from the evaporator passes, a valve hole formed in the first passage, and an insertion hole formed coaxially with the valve hole in a partition separating the first passage from the second passage;
    a valve element configured to move toward and away from the valve hole to close and open a valve section;
    a power element provided on the body and configured to sense a temperature and a pressure of the refrigerant flowing through the second passage and generate a drive force for opening or closing the valve section;
    a shaft extending through the insertion hole, having a first end connected to the power element and a second end connected to the valve element, and being configured to transmit the drive force of the power element to the valve element;
    a vibration-proof spring fixed to the body coaxially with the insertion hole, the vibration-proof spring supporting the shaft so that the shaft coaxially extends through the vibration-proof spring, the vibration-proof spring biasing the shaft radially inwardly to apply a sliding resistance to the shaft; and
    a seal ring having flexibility and being supported by one of an inner surface of a support part of the body defining the insertion hole and an outer surface of the shaft, the seal ring being in contact with the other of the inner surface of the support part and the outer surface of the shaft,
    wherein the expansion valve includes an arrangement of the seal ring, sliding portions of the shaft and the support part along each other, and the vibration-proof spring in that order from a first passage side toward a second passage side in an axial direction of the shaft,
    wherein the vibration-proof spring and the seal ring are supporting points of the shaft;

wherein the body includes a diameter-enlarged part being open toward the first passage and having an inner diameter larger than an inner diameter of the support part, and wherein the seal ring is fitted to an outer surface of the shaft opposed to the support part so as to be positioned close to the diameter-enlarged part such that a distance between the seal ring and the diameter-enlarged part is smaller than a distance between the seal ring and the vibration-proof spring.

2. The expansion valve according to claim 1, wherein the vibration-proof spring is contained in a mounting hole formed in the body coaxially with the insertion hole, and the mounting hole is open toward the second passage.

3. The expansion valve according to claim 1, wherein the seal ring is fitted into a fitting part constituted by an annular recess formed in one of the outer surface of the shaft and the inner surface of the support part.

4. The expansion valve according to claim 2, wherein the seal ring is fitted into a fitting part constituted by an annular recess formed in one of the outer surface of the shaft and the inner surface of the support part.

5. The expansion valve according to claim 3, wherein the fitting part is formed in the outer surface of the shaft.

6. The expansion valve according to claim 4, wherein the fitting part is formed in the outer surface of the shaft.

7. The expansion valve according to claim 1, wherein the seal ring is positioned on a first passage side with respect to a center in an axial direction of the sliding portions of the shaft and the support part along each other.

8. The expansion valve according to claim 2, wherein the seal ring is positioned on a first passage side with respect to a center in an axial direction of the sliding portions of the shaft and the support part along each other.

9. The expansion valve according to claim 3, wherein the seal ring is positioned on a first passage side with respect to a center in an axial direction of the sliding portions of the shaft and the support part along each other.

10. The expansion valve according to claim 5, wherein the seal ring is positioned on a first passage side with respect to a center in an axial direction of the sliding portions of the shaft and the support part along each other.

11. The expansion valve according to claim 6, wherein the seal ring is positioned on a first passage side with respect to a center in an axial direction of the sliding portions of the shaft and the support part along each other.

* * * * *